United States Patent
Wolf

(10) Patent No.: US 11,143,089 B2
(45) Date of Patent: Oct. 12, 2021

(54) MOTOR VEHICLE FRONT PART

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 315 days.

(21) Appl. No.: 16/441,009

(22) Filed: Jun. 14, 2019

(65) Prior Publication Data

US 2019/0383204 A1 Dec. 19, 2019

(30) Foreign Application Priority Data

Jun. 18, 2018 (DE) ...................... 10 2018 114 499.7

(51) Int. Cl.
| | |
|---|---|
| *B60K 11/08* | (2006.01) |
| *F01P 11/10* | (2006.01) |
| *F01P 5/06* | (2006.01) |
| *F01P 7/10* | (2006.01) |

(52) U.S. Cl.
CPC ............. *F01P 11/10* (2013.01); *B60K 11/085* (2013.01); *F01P 5/06* (2013.01); *F01P 7/10* (2013.01)

(58) Field of Classification Search
CPC ..... F01P 11/10; F01P 5/06; F01P 7/10; B60K 11/085
See application file for complete search history.

(56) References Cited

U.S. PATENT DOCUMENTS

| | | | | |
|---|---|---|---|---|
| 2,913,065 A | * | 11/1959 | Lyon, Jr. ................. | B60K 11/04 180/68.1 |
| 3,205,964 A | * | 9/1965 | Henry-Biabaud ..... | B60K 11/02 180/68.1 |
| 3,933,136 A | * | 1/1976 | Burst ...................... | B60K 11/04 123/41.58 |
| 4,362,208 A | * | 12/1982 | Hauser ................... | B60K 11/04 123/41.49 |
| 4,457,558 A | * | 7/1984 | Ishikawa .............. | B60K 11/085 296/180.5 |

(Continued)

FOREIGN PATENT DOCUMENTS

| | | |
|---|---|---|
| DE | 10228422 A1 | 1/2003 |
| DE | 102004035741 A1 | 3/2005 |

(Continued)

*Primary Examiner* — Jacob B Meyer
(74) *Attorney, Agent, or Firm* — Leydig, Voit & Mayer, Ltd.

(57) ABSTRACT

A motor vehicle front part includes: a heat exchanger; a motorized fan, which is assigned to the heat exchanger; and a two-path cooling air arrangement for controlling the air feed to the heat exchanger. The cooling air arrangement includes: an upper air inlet opening, which opens substantially toward the front; an upper flap arrangement, which corresponds to the upper air inlet opening and is actuated by motor; a lower air inlet opening, which opens substantially toward the bottom; and a lower flap arrangement, which corresponds to the lower air inlet opening and is actuated by motor. The upper air inlet opening and the lower air inlet opening are arranged upstream of the heat exchanger. A lower air outlet is downstream of the heat exchanger in an undertray of the vehicle.

10 Claims, 2 Drawing Sheets

(56) References Cited

U.S. PATENT DOCUMENTS

| | | | | |
|---|---|---|---|---|
| 4,566,407 A * | 1/1986 | Peter | ............ | B60K 11/08 123/41.48 |
| 4,706,615 A * | 11/1987 | Scadding | ............ | F01P 11/10 123/198 E |
| 5,205,484 A * | 4/1993 | Susa | ............ | B60H 1/3227 236/35.3 |
| 5,476,138 A * | 12/1995 | Iwasaki | ............ | B60H 1/00321 165/41 |
| 5,490,572 A * | 2/1996 | Tajiri | ............ | B60H 1/00392 180/65.1 |
| 5,816,350 A * | 10/1998 | Akira | ............ | E02F 9/0891 180/68.1 |
| 6,390,217 B1 * | 5/2002 | O'Brien | ............ | B60K 11/04 160/DIG. 1 |
| 6,854,544 B2 * | 2/2005 | Vide | ............ | B60L 8/006 180/68.6 |
| 7,290,630 B2 * | 11/2007 | Maeda | ............ | B62D 25/084 180/68.2 |
| 7,296,645 B1 * | 11/2007 | Kerner | ............ | B62M 27/02 180/68.1 |
| 7,484,584 B1 * | 2/2009 | Kerner | ............ | B62M 27/02 180/68.1 |
| 7,665,554 B1 * | 2/2010 | Walsh | ............ | F03D 9/32 180/2.2 |
| 8,091,516 B2 * | 1/2012 | Preiss | ............ | B60K 11/04 123/41.05 |
| 8,091,668 B2 * | 1/2012 | Amano | ............ | B60K 6/445 180/68.1 |
| 8,292,014 B2 * | 10/2012 | Sugiyama | ............ | B60K 11/085 180/68.1 |
| 8,316,974 B2 * | 11/2012 | Coel | ............ | B60K 11/085 180/68.1 |
| 8,479,853 B2 * | 7/2013 | Verbrugge | ............ | F01P 11/10 180/68.2 |
| 8,517,130 B2 * | 8/2013 | Sakai | ............ | F01P 11/10 180/68.1 |
| 8,544,583 B2 * | 10/2013 | Ajisaka | ............ | B62D 35/02 180/68.1 |
| 8,561,738 B2 * | 10/2013 | Charnesky | ............ | B60K 11/085 180/68.1 |
| 8,667,931 B2 * | 3/2014 | Kerns | ............ | F01P 7/10 123/41.05 |
| 8,689,925 B2 * | 4/2014 | Ajisaka | ............ | B60K 13/04 180/309 |
| 8,739,744 B2 * | 6/2014 | Charnesky | ............ | B60K 11/085 123/41.05 |
| 8,752,660 B2 * | 6/2014 | Ajisaka | ............ | B60K 11/06 180/68.1 |
| 8,892,314 B2 * | 11/2014 | Charnesky | ............ | F01P 7/10 701/49 |
| 9,096,278 B2 * | 8/2015 | Lee | ............ | B60K 11/085 |
| 9,188,052 B2 * | 11/2015 | Tajima | ............ | B60K 11/04 |
| 9,469,187 B1 * | 10/2016 | Ho | ............ | B60H 1/3227 |
| 9,670,824 B2 * | 6/2017 | Sowards | ............ | F01P 7/12 |
| 9,744,848 B2 * | 8/2017 | Ho | ............ | B60K 11/04 |
| 9,878,609 B2 * | 1/2018 | Dudar | ............ | F01P 7/02 |
| 9,950,612 B2 * | 4/2018 | Miller | ............ | F01P 7/12 |
| 10,106,211 B2 * | 10/2018 | Parry-Williams | ............ | B62D 35/005 |
| 10,173,496 B2 * | 1/2019 | Ho | ............ | B60K 11/08 |
| 10,344,854 B2 * | 7/2019 | Ogawa | ............ | B60K 11/085 |
| 10,563,564 B2 * | 2/2020 | Schwartz | ............ | F01P 7/048 |
| 10,647,194 B1 * | 5/2020 | Burtch | ............ | B60K 11/085 |
| 10,752,303 B2 * | 8/2020 | Parry-Williams | ............ | B60K 11/04 |
| 2003/0029581 A1 * | 2/2003 | Vide | ............ | B60L 8/006 160/201 |
| 2005/0023057 A1 * | 2/2005 | Maeda | ............ | F28F 1/128 180/68.1 |
| 2008/0017138 A1 * | 1/2008 | Rogg | ............ | B60K 11/085 123/41.05 |
| 2009/0317692 A1 * | 12/2009 | Matsumoto | ............ | H01M 8/04014 429/415 |
| 2011/0284298 A1 * | 11/2011 | Ajisaka | ............ | B60H 1/00542 180/65.21 |
| 2011/0297468 A1 * | 12/2011 | Coel | ............ | B60K 11/085 180/68.1 |
| 2012/0024611 A1 * | 2/2012 | Ajisaka | ............ | B60K 11/08 180/68.1 |
| 2012/0060776 A1 * | 3/2012 | Charnesky | ............ | B60K 11/085 123/41.05 |
| 2012/0090906 A1 * | 4/2012 | Charnesky | ............ | B60K 11/085 180/68.1 |
| 2012/0323448 A1 * | 12/2012 | Charnesky | ............ | B60K 11/085 701/49 |
| 2013/0036991 A1 * | 2/2013 | Kerns | ............ | F01P 7/10 123/41.04 |
| 2013/0059519 A1 * | 3/2013 | Tajima | ............ | B62D 35/02 454/152 |
| 2013/0081888 A1 * | 4/2013 | Charnesky | ............ | B60K 11/08 180/68.3 |
| 2013/0133963 A1 * | 5/2013 | Ajisaka | ............ | B60K 11/06 180/68.1 |
| 2013/0180789 A1 * | 7/2013 | Maurer | ............ | B60K 11/08 180/68.1 |
| 2013/0200655 A1 * | 8/2013 | Missig | ............ | B62D 35/02 296/193.09 |
| 2013/0240284 A1 * | 9/2013 | Ajisaka | ............ | F01N 3/2006 180/309 |
| 2014/0138077 A1 * | 5/2014 | Ajisaka | ............ | B60H 1/3227 165/287 |
| 2014/0251241 A1 * | 9/2014 | Tajima | ............ | B60K 11/08 123/41.56 |
| 2014/0299396 A1 * | 10/2014 | Tajima | ............ | B60K 11/04 180/68.1 |
| 2016/0368366 A1 * | 12/2016 | Miller | ............ | F01P 7/12 |
| 2018/0163863 A1 * | 6/2018 | Ogawa | ............ | B60W 10/30 |
| 2018/0209324 A1 * | 7/2018 | Schwartz | ............ | F01P 7/10 |
| 2019/0329645 A1 * | 10/2019 | Wolf | ............ | B60K 11/085 |
| 2020/0149461 A1 * | 5/2020 | Shidara | ............ | F01P 7/12 |

FOREIGN PATENT DOCUMENTS

| | | | | |
|---|---|---|---|---|
| DE | 102011115493 A1 | | 4/2012 | |
| DE | 102011111265 A1 | | 5/2012 | |
| DE | 102012102445 A1 * | | 9/2013 | ............ B60K 11/085 |
| JP | 2014092140 A | | 5/2014 | |

* cited by examiner

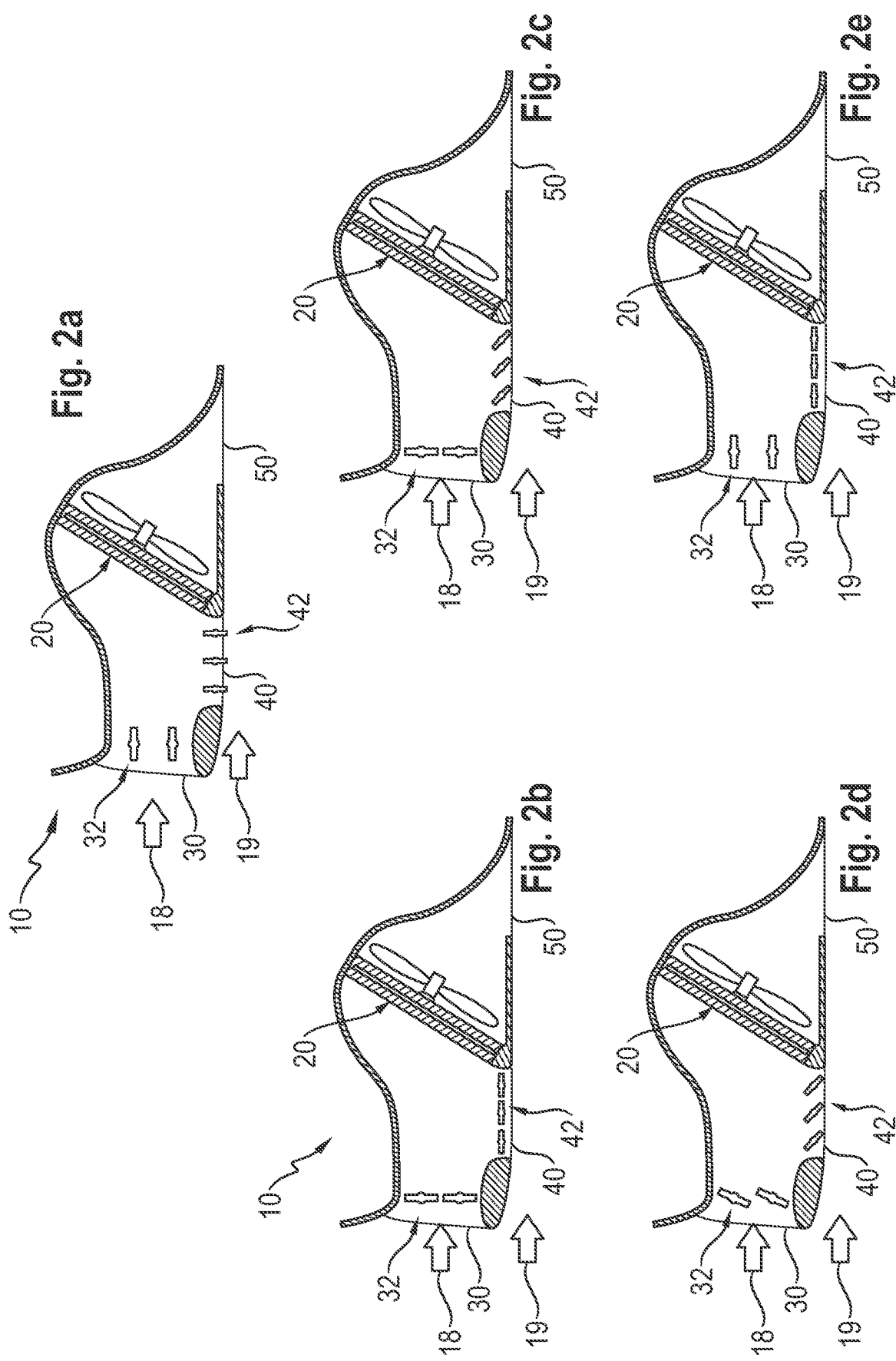

MOTOR VEHICLE FRONT PART

CROSS-REFERENCE TO PRIOR APPLICATIONS

Priority is claimed to German Patent Application No. DE 10 2018 114 499.7, filed on Jun. 18, 2018, the entire disclosure of which is hereby incorporated by reference herein.

FIELD

The present invention relates to a vehicle front part having a heat exchanger, and an upper air path and a lower air path which both lead to the heat exchanger.

BACKGROUND

A vehicle front part known, for example, from JP 201492140A, has a cooling air arrangement for controlling the air feed to the heat exchanger. The cooling air arrangement has an upper air inlet opening which opens substantially toward the front, and an upper flap arrangement which is assigned to the latter and is actuated by motor. Furthermore, the vehicle front part has a lower air inlet opening which opens substantially toward the bottom, and a lower flap arrangement which is assigned to the latter and is actuated by motor. The two air inlet openings are arranged upstream of the heat exchanger. The cooling air flows further toward the rear within the vehicle body downstream of the heat exchanger, as a result of which the cooling air flow is braked, as a result of which in turn the vehicle air resistance is increased.

SUMMARY

An embodiment of the present invention includes a motor vehicle front part that includes: a heat exchanger; a motorized fan, which is assigned to the heat exchanger; and a two-path cooling air arrangement for controlling the air feed to the heat exchanger. The cooling air arrangement includes: an upper air inlet opening, which opens substantially toward the front; an upper flap arrangement, which corresponds to the upper air inlet opening and is actuated by motor; a lower air inlet opening, which opens substantially toward the bottom; and a lower flap arrangement, which corresponds to the lower air inlet opening and is actuated by motor. The upper air inlet opening and the lower air inlet opening are arranged upstream of the heat exchanger. A lower air outlet is downstream of the heat exchanger in an undertray of the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2a to 2e show the vehicle front part which is shown in a simplified manner in FIG. 1 in the case of different vehicle speeds and requested cooling capacities.

DETAILED DESCRIPTION

Figure 1:
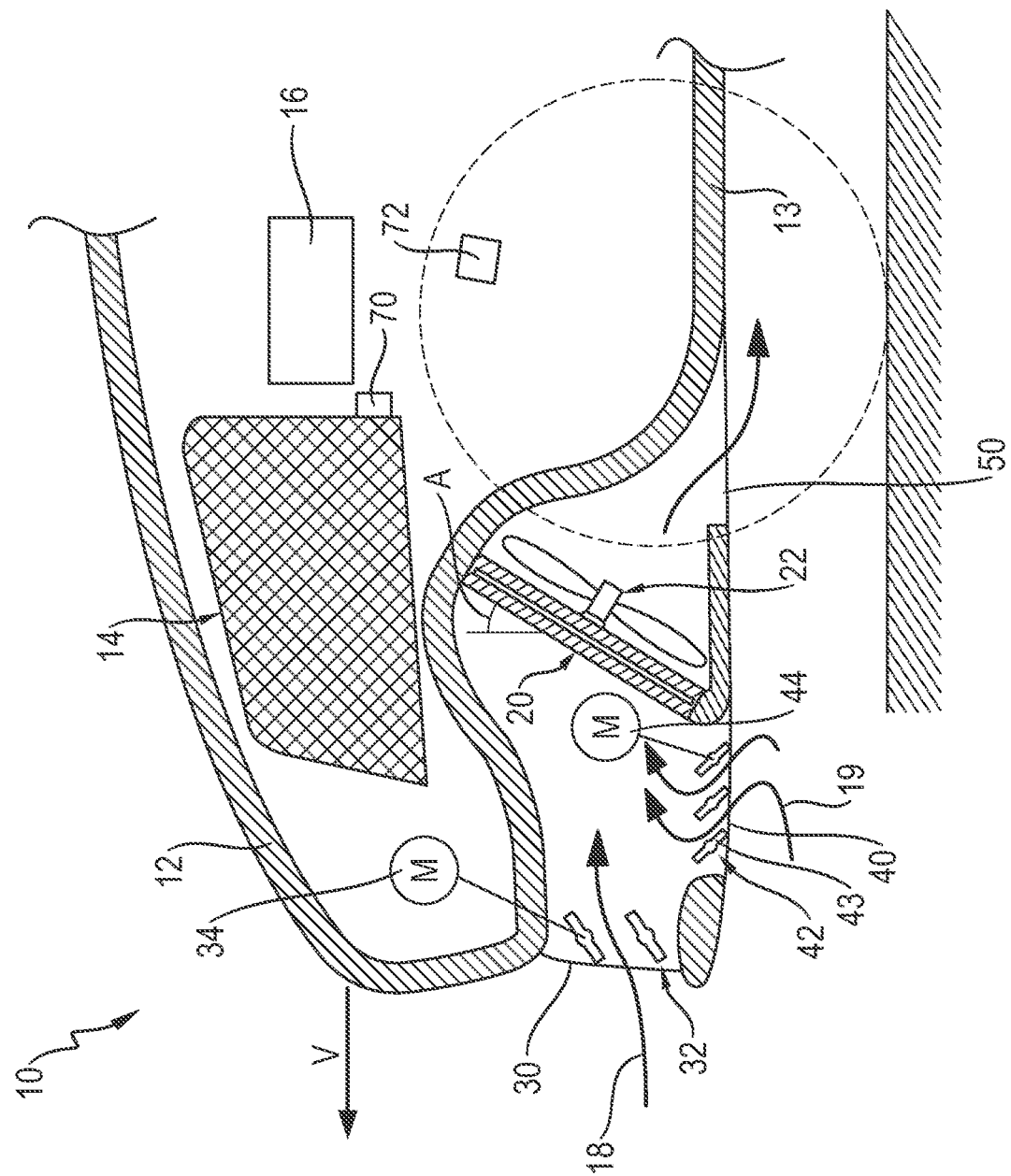
FIG. 1 shows a diagrammatic longitudinal section of a vehicle front part according to the invention having a heat exchanger and a two-path cooling air arrangement.

Embodiments of the present invention provide a vehicle front part with a cooling air arrangement with a low aerodynamic resistance. Furthermore, embodiments of the present invention provide a method for cooling air control for a vehicle front part having a lower and an upper air inlet opening, which brings about a low aerodynamic vehicle air resistance.

The vehicle front part according to an embodiment of the present invention has a heat exchanger which is part of a cooling fluid circuit and is cooled by the cooling air which flows through it. The heat exchanger is fluidically assigned a fan which can be switched on as required by a cooling controller if the passive cooling air incident flow of the heat exchanger is not sufficient for the requested cooling capacity. A two-path cooling air arrangement for controlling the cooling air feed to the heat exchanger is provided. The cooling air arrangement has an upper air inlet opening which opens substantially toward the front, with an upper flap arrangement which is assigned to the latter and is actuated by motor, and a lower air inlet opening which opens substantially toward the bottom, with a lower flap arrangement which is assigned to the latter and is actuated by motor. The two flap arrangements can consist in each case of a single flap, but can also consist in each case of a plurality of individual flaps. The two flap arrangements can preferably be configured so as to bring about a complete fluidic closure, that is to say can completely close the associated air inlet opening as required. The two flap arrangements are preferably actuated by electric motor.

A lower air outlet is provided downstream of the heat exchanger in the undertray of the vehicle. The air outlet can be arranged at a small distance from the heat exchanger, with the result that the flow resistance of the cooling air in the cooling air path between the heat exchanger and the air outlet can be kept low. In the present case, this is of great significance, in so far as relatively great cooling air flow quantities can be fed to the heat exchanger by way of the provision of two air inlets which can optionally both be in operation at the same time, that is to say can be opened. A backup of the cooling air downstream of the heat exchanger is avoided by way of the provision of a streamlined lower air outlet in the undertray in the immediate vicinity of the heat exchanger.

The heat exchanger is preferably arranged such that it is inclined toward the rear at an angle A of at least 10° with respect to the vertical. The preferably rectangular heat exchanger is therefore arranged with its base plane in an inclined manner such that the lower edge of the heat exchanger lies further toward the front than the upper edge of the heat exchanger. The perpendicular on the heat exchanger base plane therefore points obliquely downward behind the heat exchanger and approximately in the direction of the air outlet in the undertray of the vehicle. The cooling air flow between the heat exchanger and the air outlet can therefore run approximately rectilinearly from the heat exchanger to the air outlet. In this way, the overall fluid resistance of the flow passage between the heat exchanger and the air outlet is very low.

In accordance with one preferred refinement, the lower flap arrangement is configured as a louver flap arrangement with a plurality of flap louvers. In their open position, the flap louvers do not protrude out of the vehicle floor toward the bottom to a great extent, with the result that they do not influence the aerodynamics in a negative manner.

In their fully open position, the flap louvers are preferably inclined toward the front in such a way that the cooling air flow which flows in through the cooling air opening is directed forward or toward the front. A cooling air flow which is directed forward is understood to mean a flow direction which is oriented counter to the driving direction. The upper edges of the flap louvers therefore lie in each case further toward the front than the corresponding lower edges.

A motor vehicle having a vehicle front part preferably has a vehicle speed sensor and a cooling controller for controlling the fan and the two flap arrangements in a manner which is dependent on the requested cooling capacity and the vehicle speed V.

In accordance with a method according to an embodiment of the present invention, the following method steps are provided: transmitting of the vehicle speed from the speed sensor to the cooling controller; if the vehicle speed V lies below a rapid driving limit speed VG of more than 100 km/h: complete closing of the upper flap arrangement and opening of the lower flap arrangement; if the vehicle speed V lies above the rapid driving limit speed VG: complete closing of the lower flap arrangement and complete opening of the upper flap arrangement.

The flow resistance of the vehicle front part is relatively high in the case of a partially or completely open upper flap arrangement, since a relatively high stagnation point pressure is generated upstream of the partially or completely open upper flap arrangement, in particular when the fan is active. Below a rapid driving limit speed VG, the upper flap arrangement is kept closed as far as possible, in order to keep the stagnation point pressure as low as possible here. The upper flap arrangement is opened and the lower flap arrangement is closed only at very high vehicle speeds above the rapid driving limit speed of more than 100 km/h, in so far as the requested cooling capacity allows this.

In the following, an exemplary embodiment of the invention will be described in greater detail with reference to the drawings.

FIG. 1 diagrammatically shows a motor vehicle front part 10 of a motor vehicle in longitudinal section. The silhouette of the vehicle front part 10 is defined by way of a vehicle body 12, within which a heat exchanger 20, a fan 22 which is arranged downstream of the heat exchanger 20 and is driven by way of an electric drive motor, and a complex cooling air arrangement for controlling the air feed to the heat exchanger 20 and the air discharge are arranged. The cooling air arrangement guides and controls an upper frontal air path 18 and a lower air path 19 which possibly converge upstream of the heat exchanger 20.

The cooling air arrangement has an upper air inlet opening 30 which opens substantially toward the front and in the opening plane of which an upper flap arrangement 32 which can be set by way of an electric actuating motor 34 is arranged. The upper air inlet opening 30 has an upright but not necessarily perpendicular opening plane, and is flush in height terms approximately and at least partially with the heat exchanger 20.

Furthermore, the cooling air arrangement has a lower air inlet opening 40 in the vehicle undertray 13, which lower air inlet opening 40 opens substantially toward the bottom and is arranged below the upper air inlet opening 30. The base plane of the lower air inlet opening 40 lies approximately in a horizontal plane. A lower flap arrangement 42 which can be set by way of an electric actuating motor 44 is arranged in the lower air inlet opening 40. The two flap arrangements 32, 42 are configured in each case as louver flap arrangements with a plurality of flap louvers. The flap louvers 43 of the lower flap arrangement 42 do not protrude substantially out of the silhouette of the undertray 13 of the vehicle front part 10, either in the closed state or in the open state.

FIG. 1 shows the lower flap arrangement 42 in the completely open driving state, in which the flap louvers 43 are inclined obliquely toward the front at approximately 45°, with the result that the cooling air flow which flows in from below is deflected toward the front or forward. The cooling air which flows in through the upper air inlet opening 30 and through the lower air inlet opening 40 flows in a combined stream to the heat exchanger 20.

The heat exchanger 20 is arranged such that it is inclined toward the rear at an angle A of approximately 30° with respect to the vertical. The cooling air duct is widened greatly toward the top in this region. A lower air outlet 50 is provided in the undertray 13 behind the heat exchanger 20 as viewed in the driving direction and downstream of the heat exchanger 20, the opening plane of which lower air outlet 50 is arranged approximately in a horizontal plane and approximately in the horizontal base plane of the undertray 13. The central perpendicular of the base plane of the heat exchanger 20 is directed approximately toward the lower air outlet 50.

A traction battery 14 is arranged above the heat exchanger 20 in the region of the vehicle front part 10, the temperature of which traction battery 14 is determined by way of a battery temperature sensor 70. Furthermore, a speed sensor 72 which determines the vehicle speed V is arranged in the region of the front wheel. Finally, an electronic cooling controller 16 is provided which receives the sensor signals from the battery temperature sensor 70 and the speed sensor 72, and actuates the electric motor fan 22 and the two actuating motors 34, 44 of the two flap arrangements 32, 42.

FIGS. 2a to 2e show different configurations with regard to the requested cooling capacity and the vehicle speed V.

FIG. 2a shows the vehicle at a standstill or at a low speed V of, for example, at most 30 km/h and with a high requested cooling capacity. The high cooling capacity can be explained by virtue of the fact that, for example, the traction battery is being charged or the battery temperature sensor 70 is reporting a relatively high battery temperature and/or the air conditioning system is being operated at full power. In the case of said configuration, the upper flap arrangement 32 is completely open, with the result that the flap louvers are oriented approximately horizontally. The lower flap arrangement 42 is also open, with the result that the flap louvers 43 lie approximately perpendicularly.

In FIG. 2b, merely a low cooling capacity is requested, with the result that the two flap arrangements 32, 42 are completely closed, for example, at low to medium vehicle speeds. As a result, the vehicle air resistance up to medium vehicle speeds is kept low.

In FIG. 2c, a medium cooling capacity is requested at low and medium vehicle speeds. The upper flap arrangement 32 remains completely closed, and the lower flap arrangement 42 is moved into the end open position, in which the flap louvers 43 are inclined toward the front at approximately 45°, as is also shown in FIG. 1. Since the upper flap arrangement 32 remains completely closed, no ram air is formed here, but rather the driving air stream which impacts can flow away in a laminar manner. The lift at the front axle is reduced by way of the flaps 43 of the lower flap arrangement 42 which are inclined toward the front, and the air resistance is likewise kept low in said region.

In FIG. 2*d*, an increased cooling capacity is requested at medium to high speeds, with the result that the cooling air which flows in through the lower air inlet opening 40 is no longer sufficient. Therefore, the upper flap arrangement 42 is partially open.

FIG. 2*e* shows the configuration with a high to maximum requested cooling capacity for high vehicle speeds. In the present case, a high vehicle speed V is understood to mean a vehicle speed which is greater than a fixedly set rapid driving limit speed VG of over 100 km/h, for example VG=130 km/h. In the case of said configuration, the lower flap arrangement 42 is completely closed and the upper flap arrangement 32 is completely open.

By way of the differentiated cooling air strategy which is shown in FIGS. 2*a* to 2*e*, the air resistance of the vehicle 10 which is generated by way of the cooling air feed to the heat exchanger 20 is reduced to a minimum for the entire speed range of the vehicle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle front part comprising:
a heat exchanger;
a motorized fan, which is assigned to the heat exchanger; and
a two-path cooling air arrangement for controlling the air feed to the heat exchanger, the cooling air arrangement comprising:
an upper air inlet opening, which opens substantially toward a front of the motor vehicle front part;
an upper flap arrangement, which corresponds to the upper air inlet opening and is actuated by a first motor;
a lower air inlet opening, which opens substantially toward a bottom of the motor vehicle front part; and
a lower flap arrangement, which corresponds to the lower air inlet opening and is actuated by a second motor,
wherein the upper air inlet opening and the lower air inlet opening are arranged upstream of the heat exchanger,
wherein a lower air outlet is downstream of the heat exchanger in an undertray of the motor vehicle front part,
wherein the lower flap arrangement is configured as a louver flap arrangement with a plurality of flap louvers, and
wherein the flap louvers are inclined in their open position in such a way that an inflowing cooling air flow is directed toward the front.

2. The motor vehicle front part as claimed in claim 1, wherein the heat exchanger is arranged such that it is inclined toward the rear at an angle of at least 10° with respect to the vertical.

3. The motor vehicle front part according to claim 1, the motor vehicle front part comprising a vehicle body, wherein the heat exchanger and the motorized fan are arranged within the vehicle body, and wherein the motorized fan is arranged downstream of the heatexchanger.

4. The motor vehicle front part according to claim 1, wherein the two-path cooling air arrangement is configured to guide and control an upper frontal air path of the air feed from the upper air inlet opening to the heat exchanger and to guide and control a lower air path of the air feed from the lower air inlet opening to the heat exchanger, the upper frontal air path and the lower air path converging upstream of the heat exchanger.

5. The motor vehicle front part according to claim 1, wherein the upper air inlet opening opens substantially toward the front of the motor vehicle front part and has an opening plane extending substantially in a vertical direction, the upper air inlet opening being flush in height at least partially with the heat exchanger.

6. The motor vehicle front part according to claim 5, wherein the lower air inlet opening is arranged in the undertray and arranged below the upper air inlet opening.

7. The motor vehicle front part according to claim 6, wherein the lower flap arrangement is configured such that it cannot protrude out of a silhouette of the undertray.

8. The motor vehicle front part according to claim 1, wherein the lower flap arrangement is configured such that in a completely open state the flap louvers are inclined obliquely toward the front at approximately 45°.

9. The motor vehicle front part according to claim 1, wherein the cooling path arrangement comprises a cooling duct defining boundaries of the two-path cooling arrangement, wherein a width of the cooling duct widens from a portion at the lower air inlet opening to a second portion where the heat exchanger is arranged.

10. A method for controlling cooling air of a cooling air arrangement of a motor vehicle
comprising a motor vehicle front part, the motor vehicle front part comprising:
a heat exchanger;
a motorized fan, which is assigned to the heat exchanger;
the cooling air arrangement for controlling the air feed to the heat exchanger, the cooling air arrangement comprising:
an upper air inlet opening, which opens substantially toward a front of the motor vehicle;
an upper flap arrangement, which corresponds to the upper air inlet opening and is actuated by a first motor;
a lower air inlet opening, which opens substantially toward a bottom of the motor vehicle; and a lower flap arrangement, which corresponds to the lower air inlet opening and is actuated by a second motor; and a vehicle speed sensor and a cooling controller for controlling the fan and both the upper flap arrangement and the lower flap arrangement in a manner which is dependent on a required cooling capacity and a vehicle speed, wherein the upper air inlet opening and the lower air inlet opening are arranged upstream of the heat exchanger, wherein a lower air outlet is downstream of the heat exchanger in an undertray of the vehicle, wherein the method comprises:

transmitting the vehicle speed from the speed sensor to the cooling controller, if the vehicle speed lies below a rapid driving limit speed of more than 100 km/h: completely closing the upper flap arrangement and opening the lower flap arrangement, if the vehicle speed lies above the rapid driving limit speed: completely closing the lower flap arrangement and completely opening the upper flap arrangement.

* * * * *